United States Patent
Lee et al.

(10) Patent No.: US 8,032,248 B2
(45) Date of Patent: Oct. 4, 2011

(54) METHOD FOR FINDING THE CORRELATION BETWEEN THE TOOL PM AND THE PRODUCT YIELD

(75) Inventors: Yi Feng Lee, Gueishan Township, Taoyuan County (TW); Chun Chi Chen, Taipei (TW); Yun-Zong Tian, Shihgang Township, Taichung County (TW); Wei Jun Chen, Shalu Township, Taichung County (TW); Tsung-Wei Lin, Taoyuan (TW)

(73) Assignee: Inotera Memories, Inc., Taoyuan County (TW)

( * ) Notice: Subject to any disclaimer, the term of this patent is extended or adjusted under 35 U.S.C. 154(b) by 246 days.

(21) Appl. No.: 12/507,396

(22) Filed: Jul. 22, 2009

(65) Prior Publication Data

US 2010/0234978 A1 Sep. 16, 2010

(30) Foreign Application Priority Data

Mar. 11, 2009 (TW) .............................. 98107805 A

(51) Int. Cl.
G06F 19/00 (2006.01)
G06F 11/30 (2006.01)
G21C 17/00 (2006.01)
H03F 1/36 (2006.01)
H04B 15/00 (2006.01)

(52) U.S. Cl. .......... 700/174; 700/97; 700/100; 700/108; 700/111; 700/121; 700/177; 700/179; 702/184; 702/185; 702/190

(58) Field of Classification Search ................ 700/97, 700/100, 108, 111, 121, 174, 177, 179; 705/7.11, 705/7.12, 7.22, 7.23, 7.25, 7.26, 7.27; 702/184, 702/185, 190
See application file for complete search history.

(56) References Cited

U.S. PATENT DOCUMENTS

| | | | |
|---|---|---|---|
| 6,381,508 B1 * | 4/2002 | Marrie | 700/96 |
| 6,591,157 B1 * | 7/2003 | Vivirito et al. | 700/175 |
| 6,775,584 B1 * | 8/2004 | Huang et al. | 700/121 |
| 7,062,411 B2 * | 6/2006 | Hopkins et al. | 702/185 |
| 7,269,569 B2 * | 9/2007 | Spira et al. | 705/7.36 |
| 7,401,066 B2 * | 7/2008 | Beinglass et al. | 716/136 |
| 7,584,165 B2 * | 9/2009 | Buchan | 706/60 |
| 7,769,568 B2 * | 8/2010 | Marrano et al. | 703/2 |
| 2002/0035495 A1 * | 3/2002 | Spira et al. | 705/7 |
| 2003/0069648 A1 * | 4/2003 | Douglas et al. | 700/2 |
| 2003/0172002 A1 * | 9/2003 | Spira et al. | 705/27 |
| 2003/0182252 A1 * | 9/2003 | Beinglass et al. | 706/45 |
| 2005/0010311 A1 * | 1/2005 | Barbazette et al. | 700/78 |
| 2009/0171493 A1 * | 7/2009 | Govind et al. | 700/103 |
| 2009/0228129 A1 * | 9/2009 | Moyne et al. | 700/102 |
| 2009/0306804 A1 * | 12/2009 | Chao et al. | 700/110 |

* cited by examiner

*Primary Examiner* — Ronald D Hartman, Jr.
(74) *Attorney, Agent, or Firm* — Kile Goekjian Reed & McManus PLLC

(57) ABSTRACT

A method for finding the correlation between tool PM (prevention maintenance) and the product yield of the tool is disclosed. The method uses a moving average method to magnify a curve trend that is formed by the product yield data that is captured during a predetermined days before PM and after PM. The magnified curve trend is shown by a Cumulative sum chart. The Cumulative sum chart is analyzed for informing related workers of the effect between the tool PM and the product yield, so as to accurately estimate PM timing. Thereby, via the method, the effect between the tool PM and the product yield may be determined, which serves as an important reference for workers to execute further PM.

10 Claims, 6 Drawing Sheets

METHOD FOR FINDING THE CORRELATION BETWEEN THE TOOL PM AND THE PRODUCT YIELD

CROSS-REFERENCE TO RELATED APPLICATION

This application claims priority under 35 U.S.C. §119 to Taiwan Patent Application No. 098107805, filed on Mar. 11, 2009, in the Taiwan Intellectual Property Office, the entire contents of which are hereby incorporated by reference.

BACKGROUND OF THE INVENTION

1. Field of the Invention

The present invention relates to a method for finding the correlation between two subjects, in particular, to a method for finding the correlation between tool prevention maintenance (PM) and the product yield of the tool.

2. Description of Related Art

In terms of equipment manufacturing, the prevention maintenance (PM) for a tool is very important. A timely prevention maintenance schedule can effectively increase the productivity of the tool, the availability of the tool, and the associated yield of the overall equipment manufacturing. On the other hand, an improper prevention maintenance schedule besides resulting in decreased productivity and decreased yield for the associated tool, may also cause the tool itself to have a chance of malfunctioning.

SUMMARY OF THE INVENTION

In view of the aforementioned issues, the present invention provides a method for finding the correlation between a prevention maintenance (PM) of a tool and the product yield of the tool, so that via the method the effect between the tool PM and the product yield thereof may be determined, which serves as an important reference for workers to execute further PM.

To achieve the above-mentioned objectives, the present invention provides a method for finding the correlation between a prevention maintenance of a tool and the product yield of the tool, the method includes the following steps: first (a) collecting a plurality of product yield data of a plurality lots of wafers that are correspondingly formed from being processed by a plurality of tools of a production line; next, (b) according to the aforementioned product yield data, respectively calculating a yield gap between an average yield a predetermined days before the prevention maintenance of the tool and an average yield a predetermined days after the prevention maintenance of the tool; then (c) selecting the tools that has it product yield gap greater than or equal to a predetermined yield threshold.

Then, (d) within the time frame between the predetermined days before the prevention maintenance of the tool and the predetermine days after the prevention maintenance of the tool, selecting the tools that has processed wafer lots in numbers greater than or equal to a predetermined lot count threshold; which is followed by (e), finding all the product yield data generated at different time for different wafer lots from each of the tools in step (c) and step (d) and using a moving average method to magnify a curve trend that is formed by the product yield data of each tool which has been captured during the predetermined days before the prevention maintenance of the of the tool and the product yield data of each tool which has been captured during the predetermined days after the prevention maintenance of the tool, so as to decrease the effect of data noise to subsequent analysis; then, (f) displaying every one of the aforementioned magnified curve trend via a format of cumulative sum chart respectively; (g) through each of the cumulative sum chart, finding a continuous downward trend period number from the product yield data during the predetermined days before the prevention maintenance of the tool, furthermore finding a continuous upward trend period number form the product yield data during the predetermined days after the prevention maintenance, so as to find the tools that has its sum of the continuous downward trend period number and the continuous upward trend period number greater than or equal to a predetermined period threshold; lastly, (h) for those tools that are greater than or equal to the aforementioned predetermined period threshold, sending a notification information to related workers regarding the effect between the prevention maintenance for those tools and the product yield of those tools.

Therefore, the efficacy of the present invention is such that: through the feedback system of the present invention, related workers shall be informed of the effect between the prevention maintenance of a tool and the product yield of the tool, so as to more accurately manage the timing for the prevention maintenance of the tool and thereby resulting in greater product yield.

In order to further understand the techniques, means, and effects the present invention takes for achieving the prescribed objectives, the following detailed descriptions and appended drawings are hereby referred; such that, through which the purposes, features, and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1A:
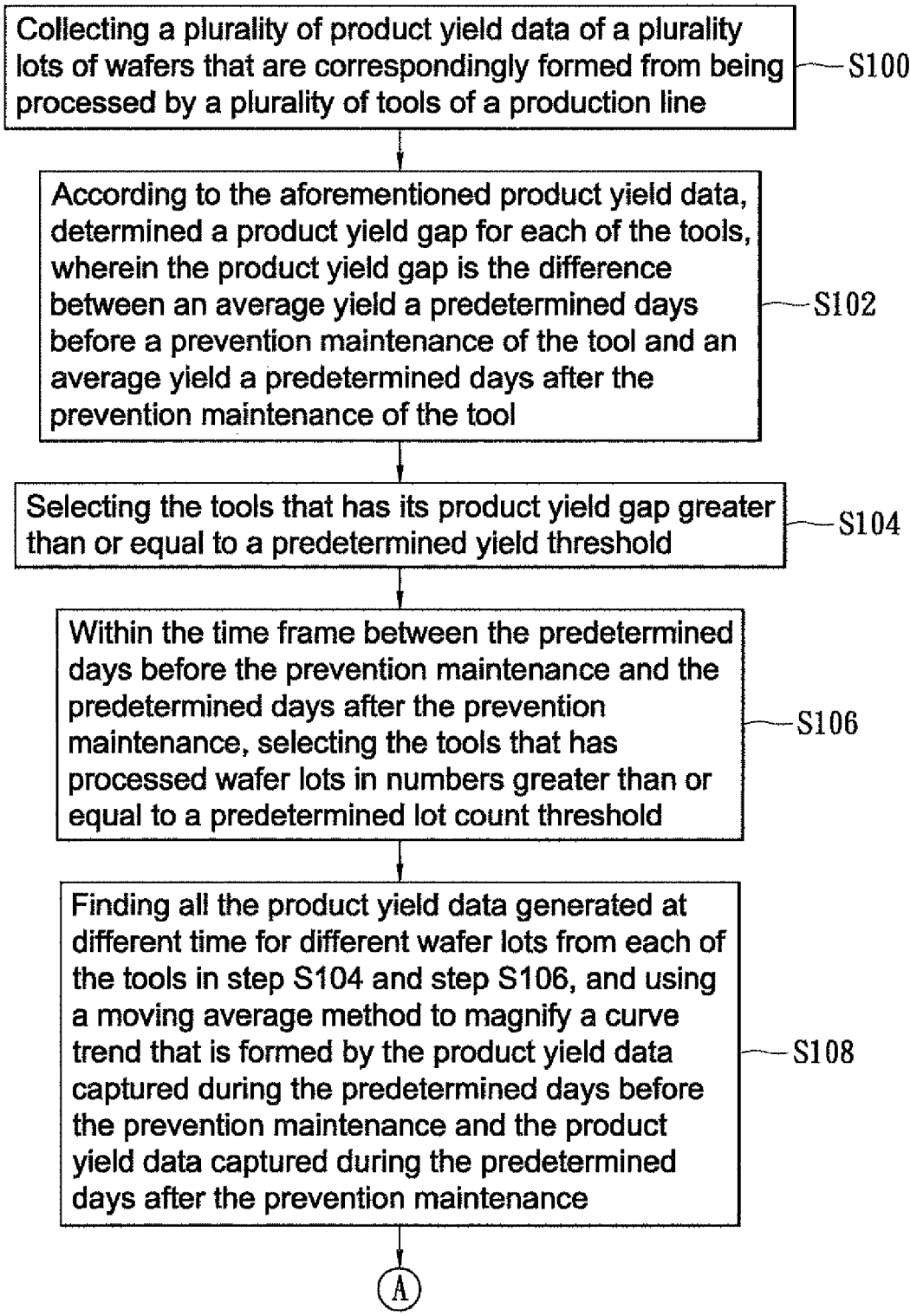
FIGS. 1A and 1B show a flowchart of a method for finding the correlation between the prevention maintenance of a tool and the product yield of the tool according to the present invention.
Figure 1B:
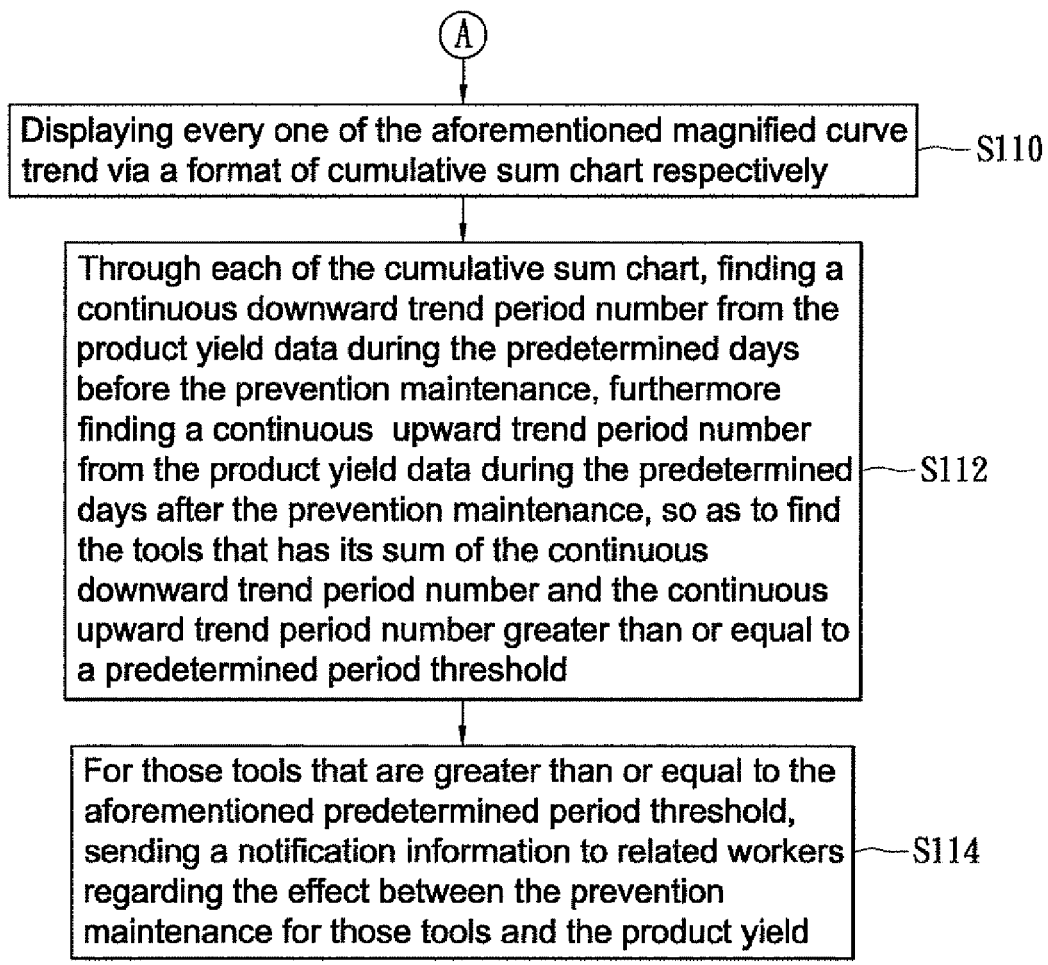

Next, the method for finding the correlation between a prevention maintenance (PM) of a tool and the product yield of the tool in accordance of the present invention is explained in conjunction with FIGS. 1A, 1B, 2A, 2B, 3A, and 3B.

First, collecting a plurality of product yield data of a plurality lots of wafers that are correspondingly formed from being processed by a plurality of tools of a production line (Step S100). In other words, due to consideration that a production line would generally have various processing lines, therefore different lots of wafers may be assigned to different tools on the production line, so that the product yield rate for each lot of wafers would generally be different, for example the difference of wear and tear on each tool may effect to result in product yield rates with different values.

Next, according to the aforementioned product yield data, respectively calculating a yield gap between an average yield a predetermined days before the prevention maintenance of the tool and an average yield a predetermined days after the prevention maintenance of the tool (Step S102); where the predetermined days before the prevention maintenance of the tool and the predetermined days after the prevention maintenance of the tool are equal number of days. As one example for the present invention, the predetermined days before the prevention maintenance of the tool and the predetermine days after the prevention maintenance of the tool are both 3 days.

Next, selecting the tools that has it s product yield gap greater than or equal to a predetermined yield threshold (Step S104). As an example, a selection equation used in step (c) for selecting the tools may be as follow:

$$|Mean\_yield(PM_{pre3}) - Mean\_yield(PM_{post3})| \geq yield\ gap\ threshold$$

wherein Mean_yield($PM_{pre3}$) is the average yield a predetermined days before the prevention maintenance, Mean_yield ($PM_{post3}$) is the average yield a predetermined days after the prevention maintenance, and the yield gap of the two average yields must be greater than or equal to the aforementioned predetermined yield gap threshold for a tool to be selected.

Then, within the time frame between the predetermined days before the prevention maintenance of the tool and the predetermined days after the prevention maintenance of the tool, selecting the tools that has processed wafer lots in numbers greater than or equal to a predetermined lot count threshold (Step S106). As an example, the above mentioned Step S106 may use a selection equation such as the one described below for selecting the tools:

$$(Lot\ count_{pre3})\ and\ (Lot\ count_{post3}) \geq Lot\ count\ threshold,$$

wherein (Lot $count_{pre3}$) and (Lot $count_{post3}$) are respectively processed wafer lot numbers during the time frame between the predetermined days before the prevention maintenance of the tool and the predetermined days after the prevention maintenance of the tool, and the wafer lot numbers must be greater than or equal to the aforementioned predetermined lot count threshold for a tool to be selected.

Next, finding all the product yield data generated at different time for different wafer lots from each of the tools in Step S104 and Step S106, and using a moving average method to magnify a curve trend that is formed by the product yield data of each tool which has been captured during the predetermined days before the prevention maintenance of the tool and the product yield data of each tool which has been captured during the predetermined days after the prevention maintenance of the tool, so as to decrease the effect of the data noise to subsequent analysis (Step S108). As an example, a magnification equation used in Step S108 may be as follows:

$$\sum_{i=1}^{n-threshold+1} Mean(YB_{period(i)} + YB_{period(i+1)} + \ldots + YB_{period(i+threshold-1)}),$$

wherein the magnification equation magnifies the curve trend that is formed by the product yield data of each tool which has been captured during the predetermined days before the prevention maintenance of the tool and the product yield data of each tool which has been captured during the predetermined days after the is prevention maintenance of the tool, and $YB_{period}$ is the product yield of each of the lots of wafers, n is the total number of lots for the wafers, and threshold is the number of period used by the moving average method.

Figure 2A:
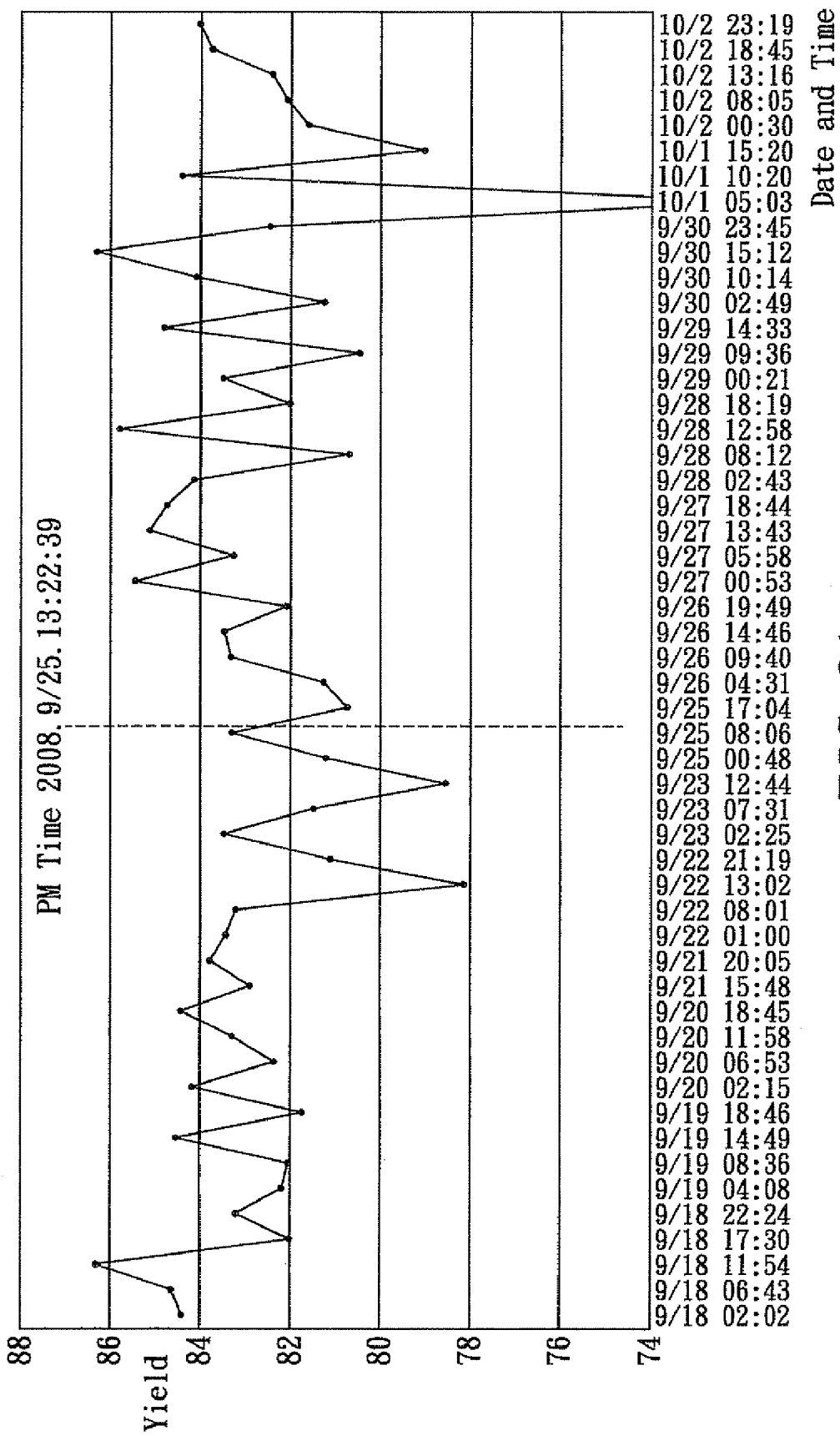
FIG. 2A shows a yield trend chart formed via the method of finding the correlation between the prevention maintenance of a tool and the product yield of the tool according to the present invention, wherein the method did not utilize moving average method.
Figure 2B:
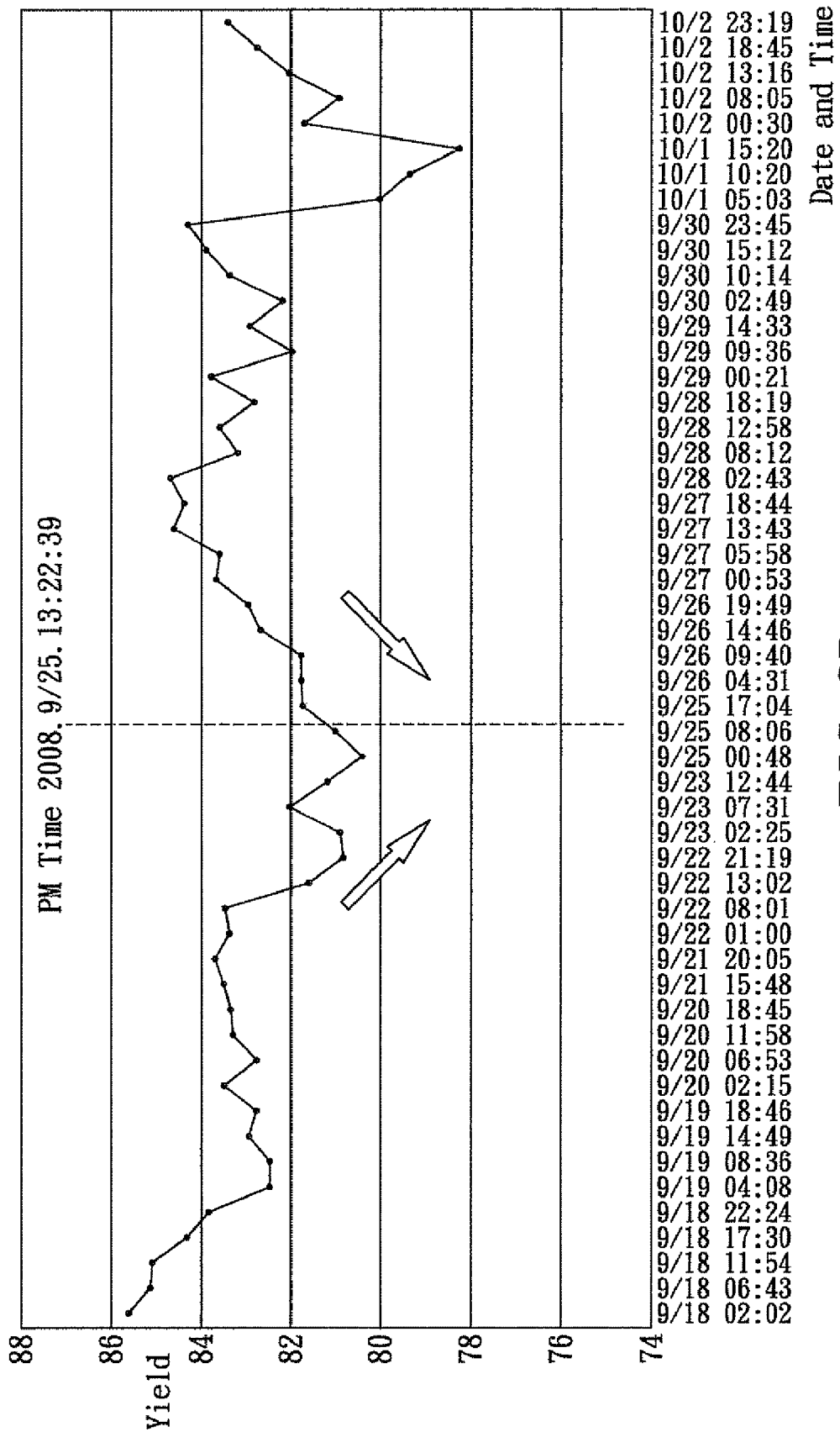
FIG. 2B shows a yield trend chart formed via the method of finding the correlation between the prevention maintenance of a tool and the product yield of the tool according to the present invention, wherein the method has utilized moving average method.

As an example, if the moving average method has not been used for "finding all the product yield data generated at different time for different wafer lots from each of the tools in Step S104 and Step S106", then the product yield data that has been found would be as shown in FIG. 2A, which cannot clearly and efficiently find the upward trend and downward trend that occurs 3 days before and 3 days after the prevention maintenance that took place at the time of 2008.9/25.13:22:39; thereby the product yield data shown in FIG. 2A has no reference value. However, on the other hand if the curve trend of the product yield data has been magnified, then the resulting graph (as shown in FIG. 2B) representing the product yield data can clearly and effectively show the upward trend and downwards trend that occurs 3 days before and 3 days after the prevention maintenance that took place at the time of 2008.9/25.13:22:39.

Figure 3A:
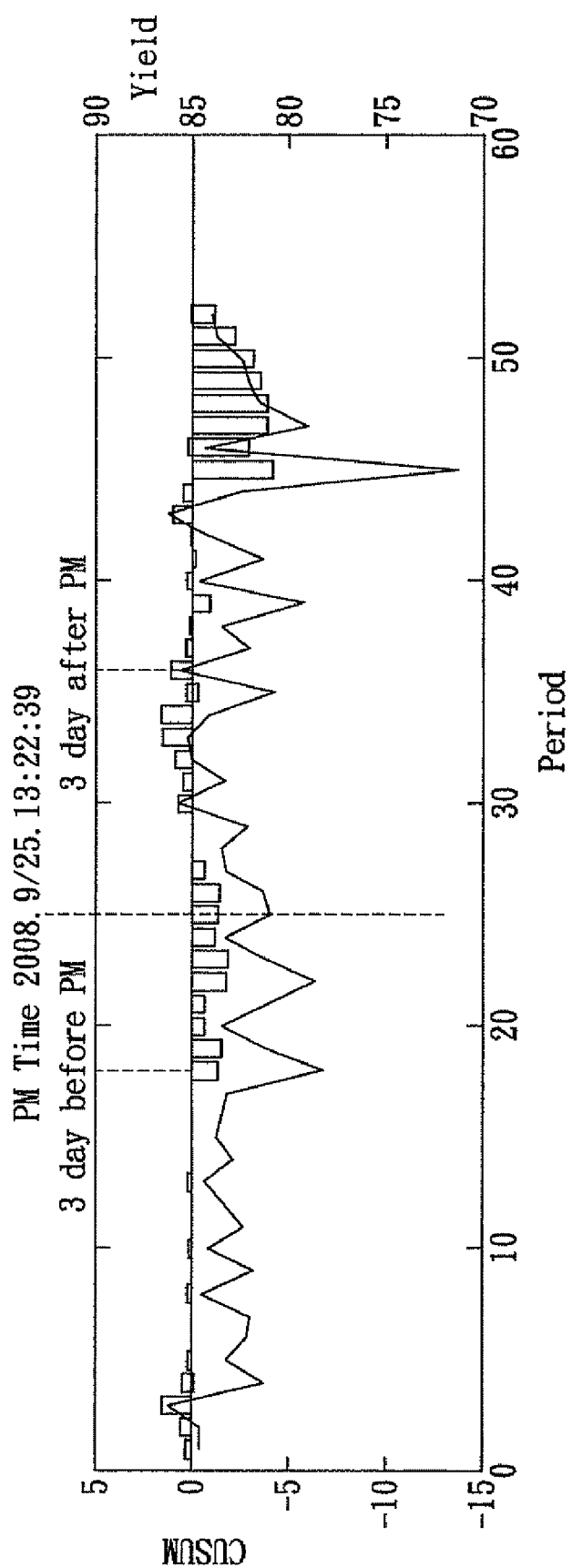
FIG. 3A shows a cumulative sum (CUSUM) chart formed via the method of finding the correlation between the prevention maintenance of a tool and the product yield of the tool according to the present invention, wherein the method did not utilize moving average method.
Figure 3B:
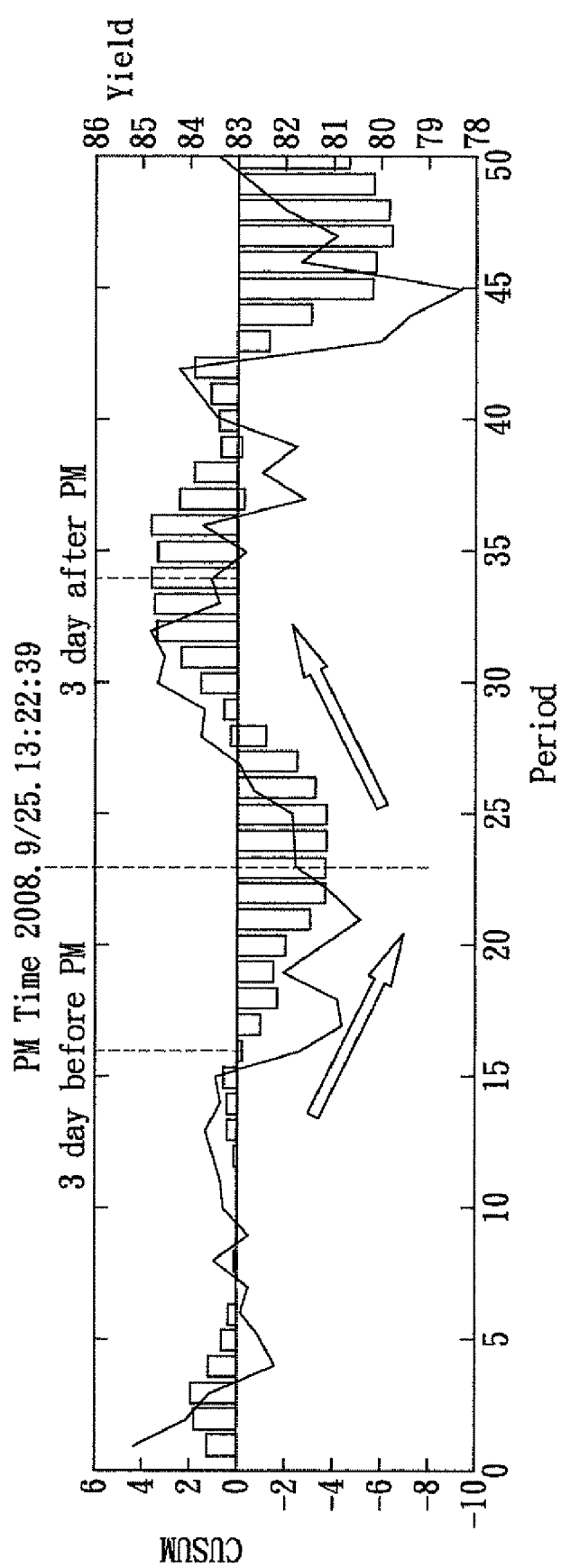
FIG. 3B shows a cumulative sum (CUSUM) chart formed via the method of finding the correlation between the prevention maintenance of a tool and the product yield of the tool according to the present invention, wherein the method has utilized moving average method.

Then, displaying everyone of the aforementioned magnified curve trend via a format of cumulative sum (CUSUM) chart respectively (Step S110). As an example, if the moving average method was not used in Step S108, then the CUSUM chart (as shown in FIG. 3A) still may not be used to effectively read the upward trend and downward trend that occurs 3 days before and 3 days after the prevention maintenance that took place at the time of 2008.9/25.13:22:39. However, if the moving average method was used in Step S108, then the CUSUM chart (as shown in FIG. 3B) may be used to effectively read the upward trend and the downward trend that occurs 3 days before and 3 days after the prevention maintenance that took place at the time of 2008.9/25.13:22:39.

Next, through each of the cumulative sum chart, finding a continuous downward trend period number from the product yield data during the predetermined days before the prevention maintenance of the tool, furthermore finding a continuous upward trend period number from the product yield data during the predetermined days after the prevention maintenance, so as to find the tools that has its um of the continuous downward trend period number and the continuous upward trend period number greater than or equal to a predetermined period threshold (Step S112). As an example, the above mentioned Step S112 may use a determination equation such as the one describe below for finding the tools:

$$(Trend\ down\ periods_{prePM} + Trend\ up\ periods_{postPM}) \geq period\ threshold,$$

wherein Trend down $periods_{prePM}$ is the continuous downward trend period number from the product yield data during the predetermined days before the prevention maintenance of the tool, Trend up $periods_{postPM}$ is the continuous upward trend period number from the product yield data during the predetermined days after the prevention maintenance, and the sum of the two period numbers must be greater than or equal to the predetermined period threshold for finding a tool.

Finally, for those tools that are greater than or equal to the aforementioned predetermined period threshold, sending a notification information to related workers regarding the effect between the prevention maintenance for those tools and the product yield of those tools (Step 112). In other words, through the feedback system of the present invention, related workers shall be informed of the effect between the prevention maintenance of a tool and the product yield of the tool, so as to more accurately manage the timing for the prevention maintenance of the tool and thereby resulting in greater product yield.

As described above, through using the moving average method, the present invention magnifies the product yield data 3 days before and 3 days after the prevention maintenance respectively for each tool, then subsequently display the magnification in terms of a CUSUM chart; through analysis of each of the CUSUM chart, workers may be informed of the effect between the prevention maintenance of the tool and the product yield of the tool, so as to accurately estimate proper future prevention maintenance timing. Thereby, via the method, the effect between the tool prevention maintenance and the product yield may be determined, which serves as an important reference for workers to execute further prevention maintenance.

The above-mentioned descriptions represent merely the preferred embodiment of the present invention, without any intention to limit the scope of the present invention thereto. Various equivalent changes, alternations, or modifications based on the claims of present invention are all consequently viewed as being embraced by the scope of the present invention.

What is claimed is:

1. A method for finding the correlation between prevention maintenance of a tool and the product yield of the tool, the method comprising:
    (a) collecting a plurality of product yield data of a plurality lots of wafers that are correspondingly formed from being processed by a plurality of tools of a production line;
    (b) according to the aforementioned product yield data, respectively calculating a yield gap between an average yield a predetermined days before the prevention maintenance of the tool and an average yield a predetermined days after the prevention maintenance of the tool;
    (c) selecting the tools that has its product yield gap greater than or equal to a predetermined yield threshold;
    (d) within the time frame between the predetermined days before the prevention maintenance of the tool and the predetermined days after the prevention maintenance of the tool, selecting the tools that has processed wafer lots in numbers greater than or equal to a predetermined lot count threshold;
    (e) finding all the product yield data generated at different time for different wafer lots from each of the tools in step (c) and step (d), and using a moving average method to magnify a curve trend that is formed by the product yield data of each tool which has been captured during the predetermined days before the prevention maintenance of the tool and the product yield data of each tool which has been captured during the predetermined days after the prevention maintenance of the tool, so as to decrease the effect of data noise to subsequent analysis;
    (f) displaying every one of the aforementioned magnified curve trend via a format of cumulative sum chart respectively;
    (g) through each of the cumulative sum chart, finding a continuous downward trend period number from the product yield data during the predetermined days before the prevention maintenance of the tool, furthermore finding a continuous upward trend period number from the product yield data during the predetermined days after the prevention maintenance, so as to find the tools that has its sum of the continuous downward trend period number and the continuous upward trend period number greater than or equal to a predetermined period threshold; and
    (h) for those tools that are greater than or equal to the aforementioned predetermined period threshold, sending a notification information to related workers regarding the effect between the prevention maintenance for those tools and the product yield of those tools.

2. The method according to claim 1, wherein the predetermined days before the prevention maintenance of the tool and the predetermined days after the prevention maintenance of the tool are equal number of days.

3. The method according to claim 2, wherein the predetermined days before the prevention maintenance of the tool and the predetermined days after the prevention maintenance of the tool are both 3 days.

4. The method according to claim 1, wherein a selection equation used in step (c) for selecting the tools comprises:

$$|\text{Mean\_yield}(PM_{pre3}) - \text{Mean\_yield}(PM_{post3})| \geq \text{yield gap threshold},$$

wherein $\text{Mean\_yield}(PM_{pre3})$ is the average yield a predetermined days before the prevention maintenance, $\text{Mean\_yield}(PM_{post3})$ is the average yield a predetermined days after the prevention maintenance, and the yield gap of the two average yields must be greater than or equal to the aforementioned predetermined yield gap threshold for a tool to be selected.

5. The method according to claim 4, wherein the predetermined days before the prevention maintenance of the tool and the predetermined days after the prevention maintenance of the tool are both 3 days.

6. The method according to claim 1, wherein a selection equation used in step (d) for selecting the tools comprises:

$$(\text{Lot count}_{pre3}) \text{ and } (\text{Lot count}_{post3}) \geq \text{Lot count threshold},$$

wherein $(\text{Lot count}_{pre3})$ and $(\text{Lot count}_{post3})$ are respectively processed wafer lot numbers during the time frame between the predetermined days before the prevention maintenance of the tool and the predetermined days after the prevention maintenance of the tool, and the wafer lot numbers must be greater than or equal to the aforementioned predetermined lot count threshold for a tool to be selected.

7. The method according to claim 6, wherein the predetermined days before the prevention maintenance of the tool and the predetermined days after the prevention maintenance of the tool are both 3 days.

8. The method according to claim 1, wherein a magnification equation used in step (e) for magnifying the curve trend comprises:

$$\sum_{i=1}^{n-threshold+1} \text{Mean}(YB_{period(i)} + YB_{period(i+1)} + \ldots + YB_{period(i+threshold-1)}),$$

wherein the magnification equation magnifies the curve trend that is formed by the product yield data of each tool which has been captured during the predetermined days before the prevention maintenance of the tool and the product yield data of each tool which has been captured during the predetermined days after the prevention maintenance of the tool, and $YB_{period}$ is the product yield of each of the lots of wafers, n is the total number of lots for the wafers, and threshold is the number of period used by the moving average method.

9. The method according to claim 8, wherein the predetermined days before the prevention maintenance of the tool and the predetermined days after the prevention maintenance of the tool are both 3 days.

10. The method according to claim 1, wherein a determination equation used in step (g) for finding the tools comprises:

(Trend down periods$_{prePM}$+Trend up periods$_{postPM}$)$\geq$ period threshold, wherein Trend down periods$_{prePM}$ is the continuous downward trend period number from the product yield data during the predetermined days before the prevention maintenance of the tool, Trend up periods$_{postPM}$ is the continuous upward trend period number from the product yield data during the predetermined days after the prevention maintenance, and the sum of the two period numbers must be greater than or equal to the predetermined period threshold for finding a tool.

* * * * *